(12) United States Patent
Lugger et al.

(10) Patent No.: US 7,099,945 B2
(45) Date of Patent: Aug. 29, 2006

(54) MAPPING CONTROL FUNCTIONS OF A PLURALITY OF COMMUNICATION INSTALLATIONS INTO A SINGLE LOGICAL INTERFACE

(75) Inventors: Volker Lugger, Frondenberg (DE); Rainer Ucker, Mulheim (DE); Ralf Neuhaus, Lunen (DE)

(73) Assignee: Siemens Aktiengesellschaft, Munich (DE)

( * ) Notice: Subject to any disclaimer, the term of this patent is extended or adjusted under 35 U.S.C. 154(b) by 765 days.

(21) Appl. No.: 09/956,619

(22) Filed: Sep. 19, 2001

(65) Prior Publication Data

US 2002/0073192 A1 Jun. 13, 2002

(30) Foreign Application Priority Data

Sep. 19, 2000 (DE) ................. 100 46 320

(51) Int. Cl.
*G06F 13/00* (2006.01)
(52) U.S. Cl. .................................... 709/227
(58) Field of Classification Search ........... 370/351, 370/352; 709/230, 232, 227
See application file for complete search history.

(56) References Cited

U.S. PATENT DOCUMENTS

| | | | |
|---|---|---|---|
| 5,915,012 A | 6/1999 | Miloslavsky | 379/265.02 |
| 5,978,672 A | 11/1999 | Hartmaier et al. | |
| 6,026,085 A * | 2/2000 | Chau et al. | 370/352 |
| 6,804,224 B1 * | 10/2004 | Schuster et al. | 370/352 |

FOREIGN PATENT DOCUMENTS

| | | |
|---|---|---|
| DE | 100 44 436 A1 | 4/2002 |
| WO | WO 96/27266 | 9/1996 |
| WO | WO 1997/06625 | 2/1997 |

OTHER PUBLICATIONS

Johnson, P.: "*The Importance of Systems Management for a Parallel Sysplex*", IBM Systems Journal, New York, US, Bd. 36, Nr. 2, 1997, S. 301-326.
"*CallPath CallCoordinator/CICS for OS/390; General Information*; Version 2, Release 1; Document No. GC34-5394-01", Jun. 2000.
"*HiPath AllServe 150 V1.0*", Online, Feb. 2001.

* cited by examiner

*Primary Examiner*—Robert B. Harrell
(74) *Attorney, Agent, or Firm*—Bell, Boyd & Lloyd LLC

(57) ABSTRACT

The present invention relates to a distributed communication system including server for executing communications applications and service features for communications installations. Preferably, the system is provided as a private communication system, wherein the communications installations are connected to one another via a network preferably an IP-oriented. The communications installations each have a local software interface which can be used by the server to control the functionality of the communications installation. A central software interface in the server maps the respective local software interfaces of the individual communications installations in a single superordinate logical software interface. The central software interface is used by the communications applications to access the resources of the individual communications installations.

15 Claims, 2 Drawing Sheets

MAPPING CONTROL FUNCTIONS OF A PLURALITY OF COMMUNICATION INSTALLATIONS INTO A SINGLE LOGICAL INTERFACE

BACKGROUND OF THE INVENTION

The present invention relates to a distributed communication system. Modem communication systems frequently are made up of a plurality of physically distributed, interlinked communications installations. In this context, each of the communications installations has its own switching intelligence and its own local database for storing data specific to the communications installation. Each local database specific to a communications installation is used for storing data required for independent operation of its respective communication installation. This is frequently referred to in the literature as 'standalone operation' of a communications installation. For example, the local data bases may store subscriber numbers, authorizations, exchange lines, direct-dial numbers, call numbers, configuration data, short-code dialing destinations, etc., for the communications installation. To produce an interconnected network of such communications installations, each individual communications installation must be configured appropriately on an individual basis. In other words, each communication installation must be brought into line with the data stored in the other communications installations that form the network.

Generally, the communications installations additionally have software interfaces, frequently also referred to in the literature as programming interfaces. The software interfaces can be used to externally implement particular control functions of the respective communications installation, e.g. from a data processing device connected to the communications installation via a hardware interface. One example of such a software interface is the CSTA interface (Computer Supported Telecommunications Applications) standardized by the ECMA (European Computer Manufacturer Association). The CSTA interface can be accessed using an external hardware interface, such as a V.24 or $S_0$ interface.

In a modem communication system that includes a plurality of interlinked communication devices, the external data processing device can also be connected directly to the network that connects the communication devices. Communications applications running on the external data processing device can thus use the network to access the software interfaces of the respective communication devices in the communication system.

However, within the context of known communications applications for implementing control functions for a communication device, only a single communication device can be selectively addressed. Therefore, in a communication system that includes a multiplicity of distributed and interlinked communication devices, each communication device requires device specific applications. All-embracing centralized implementation of applications has not been possible to date using the existing communications applications.

SUMMARY OF THE INVENTION

In light of the preceding background, an object of the present invention is to provide measures which permit control functions to be implemented centrally for a plurality of communication devices within a distributed communication system.

The present invention achieves this object within a communication system that includes multiple communication devices and a central processing device. The communication devices and the central processing device are connected to one another by a network, and Communications applications are executed by the central processing device. Each communication device includes a local interface unit which can be used for controlling control functions in the corresponding communication device, and a central interface unit is arranged within the central data processing device. The central interface unit maps the respective interface units of the communications devices onto a superordinate logical interface.

On the basis of the present invention, the central data processing device, referred to as the server below, holds a central software interface which maps the individual local software interfaces of the distributed communication devices of the communication system onto a superordinate logical interface. A communications application running on the server thus sees the distributed communications system as one unit having an appropriately high number of hardware resources, such as subscriber lines, exchange lines and call numbers.

One advantage of the present invention is, among other things, that existing communications applications can continue to be used unchanged. In addition, new communications applications can be developed independently of the structure of a communication system. This means that it is a simple matter to develop and use a central communications application even for individual systems which are at a great physical distance from one another, e.g. in different towns and countries.

In an embodiment of the invention, the central software interface automatically recognizes which of the communication devices within the communication system on which a respective control function is to be implemented. The central software interface then controls the data interchange for implementing the control function, with the appropriate communication device as appropriate.

To implement a control function for a communications installation, for example, to activate or deactivate a service feature, to execute a telecommunications application or implement administration functions, the server accesses a particular resource such as a call number, a subscriber line, an exchange line, or the like, of the communication system. In this context, the central software interface automatically recognizes which communication device holds the respective resource. This may be accomplished by accessing a memory apparatus managing the appropriate data, and communicating with the respective communication device via the network in order to implement the control function.

In a preferred embodiment of the invention, the network is an IP-oriented (Internet Protocol) network, such as an LAN (Local Area Network) or a WAN (Wide Area Network) implementing IP protocols.

In accordance with another aspect of the invention, the memory apparatus associated with the server stores the call numbers (e.g. call number ranges) of a respective communication device in the communication system. In addition, the memory apparatus contains information about which address (e.g. IP address) is associated with the respective communication device in the network.

With the present invention, the central software interface advantageously maps the local software interfaces of the communication devices into a central software interface operating on the basis of the CSTA standard.

Additional features and advantages of the present invention are described in, and will be apparent from, the following Detailed Description of the Invention and the figures.

DETAILED DESCRIPTION OF THE INVENTION

Figure 1:
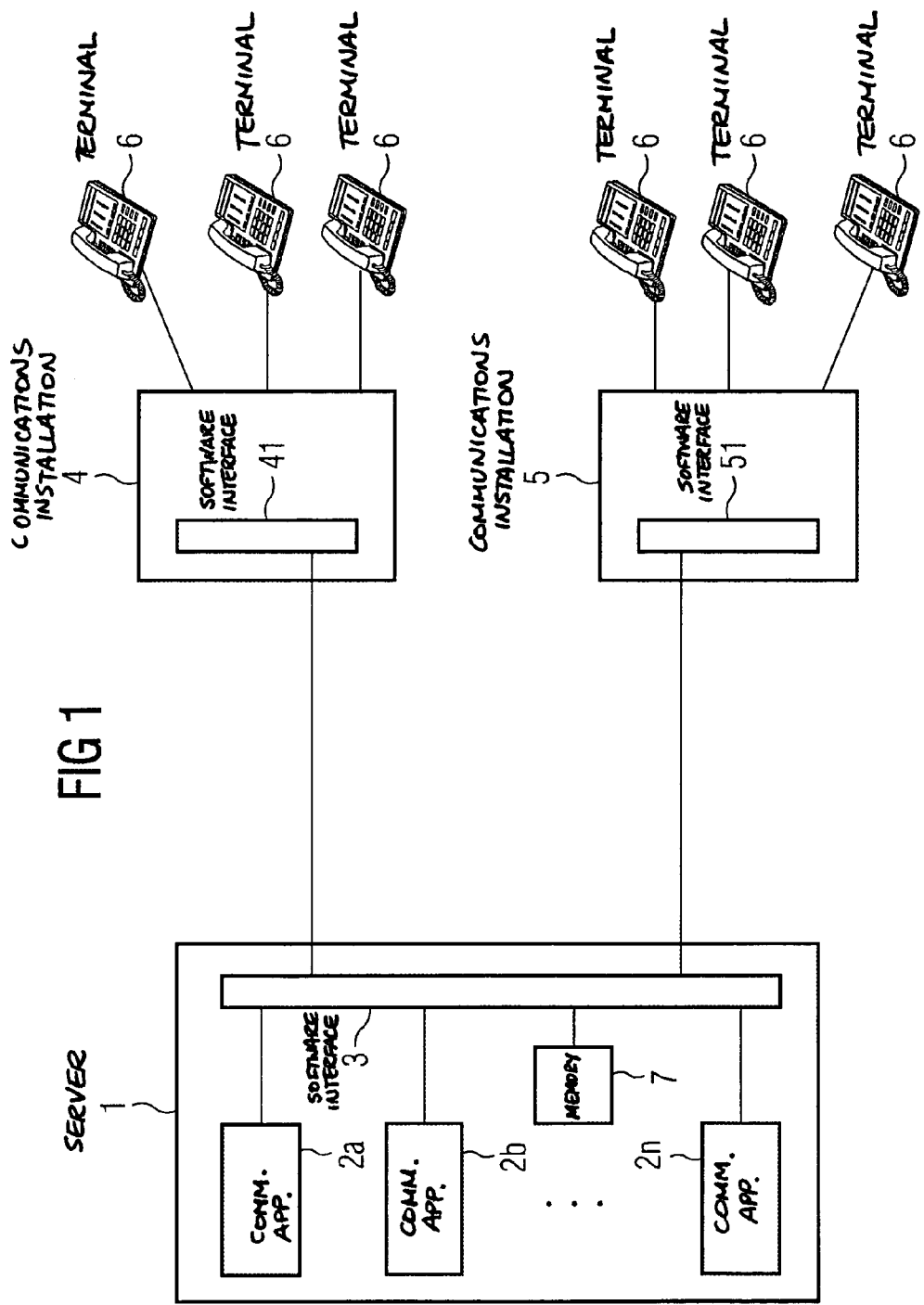
FIG. 1 is a schematic diagram illustrating a communication system according to the present invention including two communications installations and a central server.

FIG. 1 shows a schematic diagram of a distributed communication system. The system includes a server 1 and two communications installations 4, 5. The communications installations 4, 5 are used to connect the terminals 6 to the communication system. The terminals 6 may be, for example, telephones or data processing devices.

The communications installations 4, 5 can be connected to one another and to the server 1 by a network, such as for example, a local area network (LAN), a wide area network (WAN), a global network such as the Internet, or else via circuit-switched communication networks, such as ISDN-type networks. In this case, bidirectional data transmission takes place using a "tunneling mechanism", in which the messages of a networking protocol specific to the communications installations are packaged into messages of the appropriate transmission protocol (e.g. the IP protocol or the ISDN protocol) and are transmitted via the network.

The communications installations 4, 5 each have a local software interface 41, 51 which, according to the embodiment shown in FIG. 1, is designed according to the CSTA standard. The software interfaces 41, 51 can be used by devices external to the communications installation to influence the operation of the respective communications installation 4, 5. For example, external devices can be used to activate or deactivate service features, execute communications applications or configure the respective communications installation using an administration application through the software interfaces 41, 51.

According to the invention, a central software interface 3 is implemented in the server. The central software interface 3 maps the local software interfaces 41, 51 of the communications installations 4, 5 in the communication system onto a single superordinate logical software interface. In this way, communications applications 2a, . . . ,2n running on the server 1 see the communication system as a single device having just one software interface. The communications applications 2a, . . . , 2n denote all the functions that interact with the communications installations 4, 5 which can be implemented by the server 1. For example, the communications applications 2a, . . . ,2n may represent activation and deactivation of service features or execution of administration applications.

In this context, each of the communications applications 2a, . . . , 2n implements functions which take up particular resources of the communication system. For example, each application may take up one or more particular call numbers, exchange lines, etc. The central software interface 3 automatically recognizes which of the communications installations 4, 5 within the communication system on which the respective function is to be implemented. If, for example, the server 1 activates a service feature for a particular call number in the communications installation 4, the central software interface 3 ascertains the address, such as the IP address, of the appropriate communications installation 4, in the network by accessing a memory apparatus 7 of the server 1. The server then sends the appropriate instructions for implementing the service feature to the communications installation 4 via the network.

Thus, central software interface 3 allocates the respective resources of the communication system to an appropriate communications installation 4, 5 and activates the respective control function in the appropriate communications installation 4, 5.

Figure 2:
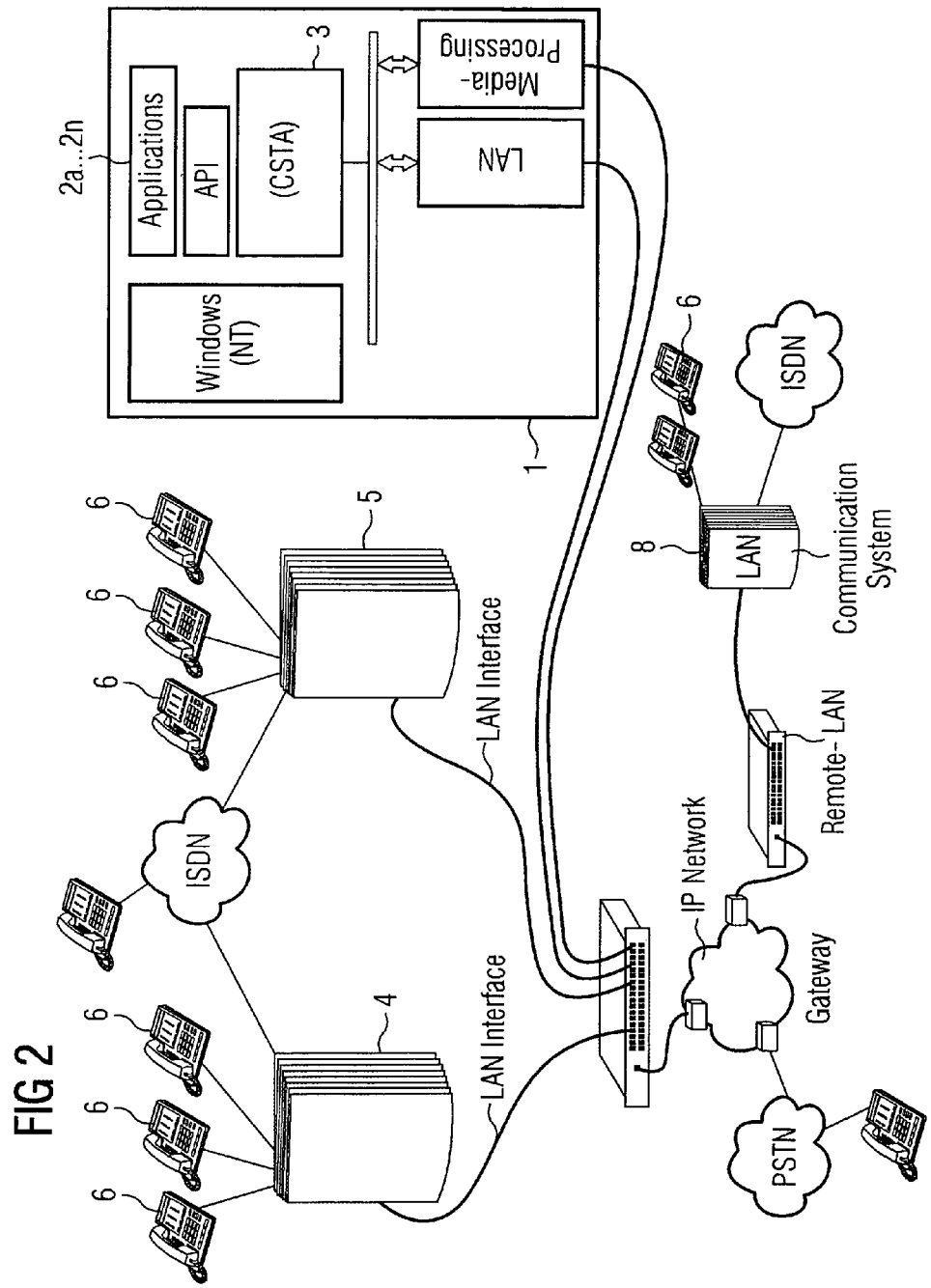
FIG. 2 is an illustrative example of a distributed communication system according to the present invention.

FIG. 2 illustrates an exemplary arrangement of a distributed communication system. Preferably, the communication system is a private network. In the present exemplary embodiment, the individual components of the communication system include the server 1 and the communications installations 4, 5 networked together via an Ethernet LAN. The server 1 and communication installations 4, 5 interchange signaling and voice data via the Ethernet LAN. Another communications installation 8, for example a branch office of a company, is connected to the Ethernet LAN via an IP network, such as the 'Internet.' In this way the preferably private communication system can be extended globally.

A central software interface 3 according to the invention is implemented on the server 1. The central software interface combines the software interfaces (not shown in the figure) of the distributed communications installations 4, 5, 8.

FIG. 2 shows the central software interface 3 as a central service provider which simultaneously converts the software interfaces specific to the communications installations to another software interface of the server. In a preferred embodiment CSTA oriented interfaces are converted to Application Programming Interfaces (API-type interfaces), preferably a TAPI-type interface (Telephoning API). The central server 1 may run on a standard operating system such as 'Windows NT'$^{TM}$ from Microsoft. The operating system controls the individual functions of the server 1, inter alia the communications applications 2a, . . . , 2n running on the server 1.

The mapping (combination) of the individual systems of the communication system into a superordinate interface means that the communications applications 2a, . . . , 2n running on the server 1 see the distributed communication system as but a single system (Single System Image). That is to say that a communications application 2a, . . . , 2n sees—via the combined interfaces—only a single system having an appropriately high number of resources (e.g. subscriber lines, exchange lines, call numbers etc.). A communications application 2a, . . . , 2n produced for an individual system can thus also be used for a distributed communication system without alteration and can thus be developed entirely independently of the type of superordinate hardware or of a possibly distributed structure.

The communications applications 2a, . . . ,2n in accordance with the present invention can, as shown in the FIG. 2, also be used for individual systems which are at a great physical distance from one another, such as communications installations in multiple branch offices of a company which are located in different towns or even in different countries.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A communication system comprising:
    a plurality of communication installations, each of the installations having a respective local interface unit that executes control functions relating to one or more terminals connected to the installation, wherein each of the respective local interface units operate under a Computer Supported Telecommunications Applications protocol;
    a central data processing device;
    a network connecting said plurality of installations and said central processing device; and
    a central interface unit, arranged in the central data processing device which maps the control functions of the local interface units of each of the installations onto a single logical interface, and activates a control function within one or more installations based on the resulting map.

2. The communication system as claimed in claim 1, wherein the central interface unit comprises:
    (a) means for automatically recognizing which of the plurality of installations within the communication network on which a respective control function is to be implemented, and
    (b) means for controlling data interchange for implementing the control function when such control function is recognized.

3. The communication system as claimed in claim 2, further comprising: a memory apparatus arranged in the central data processing device for storing call numbers available for a respective installation, said call numbers being stored in relation to an address which uniquely identifies the respective installation in the communication system.

4. The communication system as claimed in claim 3, wherein the network is an IP-oriented network.

5. The communication system as claimed in claim 4, wherein the installations are private communications installations.

6. The communication system as claimed in claim 3, wherein the installations are private communications installations.

7. The communication system as claimed in claim 2, wherein the network is an IP-oriented network.

8. The communication system as claimed in claim 7, wherein the installations are private communications installations.

9. The communication system as claimed in claim 2, wherein the installations are private communications installations.

10. The communication system as claimed in claim 1, further comprising: a memory apparatus arranged in the central data processing device for storing call numbers available for a respective installation, said call numbers being stored in relation to an address which uniquely identifies the respective installation in the communication system.

11. The communication system as claimed in claim 10, wherein the network is an IP-oriented network.

12. The communication system as claimed in claim 11, wherein the installations are private communications installations.

13. The communication system as claimed in claim 1, wherein the network is an lIP-oriented network.

14. The communication system as claimed in claim 13, wherein the installation are private communications installations.

15. The communication system as claimed in claim 1, wherein the installations are private communications installations.

* * * * *